(12) United States Patent
Kim et al.

(10) Patent No.: US 12,346,763 B2
(45) Date of Patent: Jul. 1, 2025

(54) ELECTRONIC DEVICE POWERED ON IN RESPONSE TO RADIO FREQUENCY SIGNAL, NEAR FIELD COMMUNICATION TAG CIRCUIT INCLUDED THEREIN, AND OPERATING METHOD THEREOF

(71) Applicant: 3A LOGICS Co., LTD., Seongnam-si (KR)

(72) Inventors: Sung Wan Kim, Gwangju-si (KR); Pyeong Han Lee, Seongnam-si (KR); Kwang Beom Park, Seongnam-si (KR); Sung Hun Chun, Gunpo-si (KR); Chang Ho Ryu, Seongnam-si (KR)

(73) Assignee: 3A LOGICS Co., LTD., Seongnam-si (KR)

( * ) Notice: Subject to any disclaimer, the term of this patent is extended or adjusted under 35 U.S.C. 154(b) by 0 days.

(21) Appl. No.: 18/395,378

(22) Filed: Dec. 22, 2023

(65) Prior Publication Data

US 2024/0330616 A1 Oct. 3, 2024

(30) Foreign Application Priority Data

Mar. 31, 2023 (KR) .................. 10-2023-0042963

(51) Int. Cl.
| | |
|---|---|
| *G06K 7/10* | (2006.01) |
| *G05F 1/56* | (2006.01) |
| *G06K 19/07* | (2006.01) |
| *H04B 5/73* | (2024.01) |
| *H04B 5/79* | (2024.01) |

(52) U.S. Cl.
CPC ........... *G06K 7/10297* (2013.01); *G05F 1/56* (2013.01); *G06K 19/0723* (2013.01); *H04B 5/73* (2024.01); *H04B 5/79* (2024.01)

(58) Field of Classification Search
CPC .......... G06K 7/10297; G06K 19/0723; G06K 7/10237; G06K 19/0702; G05F 1/56; H04B 5/73; H04B 5/79; H04B 5/72; H04B 5/70; H02J 13/00022; G06F 1/26
See application file for complete search history.

(56) References Cited

U.S. PATENT DOCUMENTS

| | | | |
|---|---|---|---|
| 11,026,609 B2 | 6/2021 | Biederman et al. | |
| 2010/0291869 A1* | 11/2010 | Wilson .................. | H04B 5/79 455/41.1 |

FOREIGN PATENT DOCUMENTS

| | | |
|---|---|---|
| JP | 2017-139943 | 8/2017 |
| KR | 10-0834841 | 6/2008 |
| KR | 10-2011-0070781 | 6/2011 |
| KR | 10-2014-0091362 | 7/2014 |

* cited by examiner

*Primary Examiner* — Jamara A Franklin

(57) ABSTRACT

A near field communication (NFC) device includes a DC power supply configured to output a DC voltage, an NFC interface configured to generate a control signal in response to an NFC signal, and a voltage supply control circuit configured to supply the DC voltage to an electronic circuit in response to the control signal and maintain supply of the DC voltage to the electronic circuit in response to a voltage maintaining signal generated by the electronic circuit powered on by the DC voltage.

14 Claims, 7 Drawing Sheets

ELECTRONIC DEVICE POWERED ON IN RESPONSE TO RADIO FREQUENCY SIGNAL, NEAR FIELD COMMUNICATION TAG CIRCUIT INCLUDED THEREIN, AND OPERATING METHOD THEREOF

CROSS-REFERENCE TO RELATED APPLICATION

This application claims the benefit of Korean Patent Application No. 10-2023-0042963, filed on Mar. 31, 2023, in the Korean Intellectual Property Office, the disclosure of which is incorporated herein in its entirety by reference.

BACKGROUND

The inventive concept relates to an electronic device that is powered on in response to only a radio frequency (RF) signal, and more particularly, to an electronic device that is powered on in response to only an RF signal transmitted from an external electronic device and remains in a power-on state, a near field communication (NFC) tag circuit included in the electronic device, and an operating method of the electronic device.

Radio-frequency identification (RFID) may be classified into low-frequency (LF) RFID, high-frequency (HF) RFID, and ultrahigh-frequency (UHF) RFID, according to the frequency of radio waves used for communication.

Low frequencies range from 30 kHz to 300 kHz. LF RFID systems typically operate at a frequency of 125 kHz or 134.2 kHz.

High frequencies range from 3 MHz to 30 MHz. HF RFID systems operate at a frequency of 13.56 MHz. HF RFID systems using 13.56 MHz refer to NFC.

Ultrahigh frequencies range from 300 MHz to 3 GHz. UHF RFID systems operate at a frequency of 860 MHz to 960 MHz. A passive RFID tag refers to a tag that does not include a battery therein. The passive RFID tag generates operating voltages by using an RF signal transmitted from an RFID reader.

SUMMARY

The inventive concept provides an electronic device capable of supplying a DC voltage, which is generated by a DC power supply included in the electronic device without a power button, to an internal system thereof in response to a radio frequency (RF) signal transmitted from an external electronic device and maintaining the supply of the DC voltage to the internal system even though a separate RF signal is not received thereafter, a near field communication (NFC) tag circuit included in the electronic device, and an operating method of the electronic device.

According to an aspect of the inventive concept, there is provided an NFC device including a DC power supply configured to output a DC voltage, an NFC interface configured to generate a control signal in response to an NFC signal, and a voltage supply control circuit configured to supply the DC voltage to an electronic circuit in response to the control signal and maintain supply of the DC voltage to the electronic circuit in response to a voltage maintaining signal generated by the electronic circuit powered on by the DC voltage.

According to another aspect of the inventive concept, there is provided an electronic device including an electronic circuit including a main controller unit and an NFC tag circuit, wherein the NFC tag circuit includes a DC power supply configured to generate a DC voltage, an NFC interface configured to generate a control signal in response to an NFC signal, and a voltage supply control circuit configured to supply the DC voltage to an electronic circuit in response to the control signal and maintain supply of the DC voltage to the electronic circuit in response to a voltage maintaining signal output from the electronic circuit powered on by the DC voltage.

According to a further aspect of the inventive concept, there is provided an operating method of an electronic device. The operating method includes generating a control signal in response to a radio frequency signal, supplying a DC voltage of a DC power supply to an electronic circuit in a power-off state in response to the control signals, generating a voltage maintaining signal by using the electronic circuit that has been powered on by the DC voltage, and maintaining the electronic circuit in a power-on state by continuously supplying the DC voltage to the electronic circuit according to the voltage maintaining signal.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
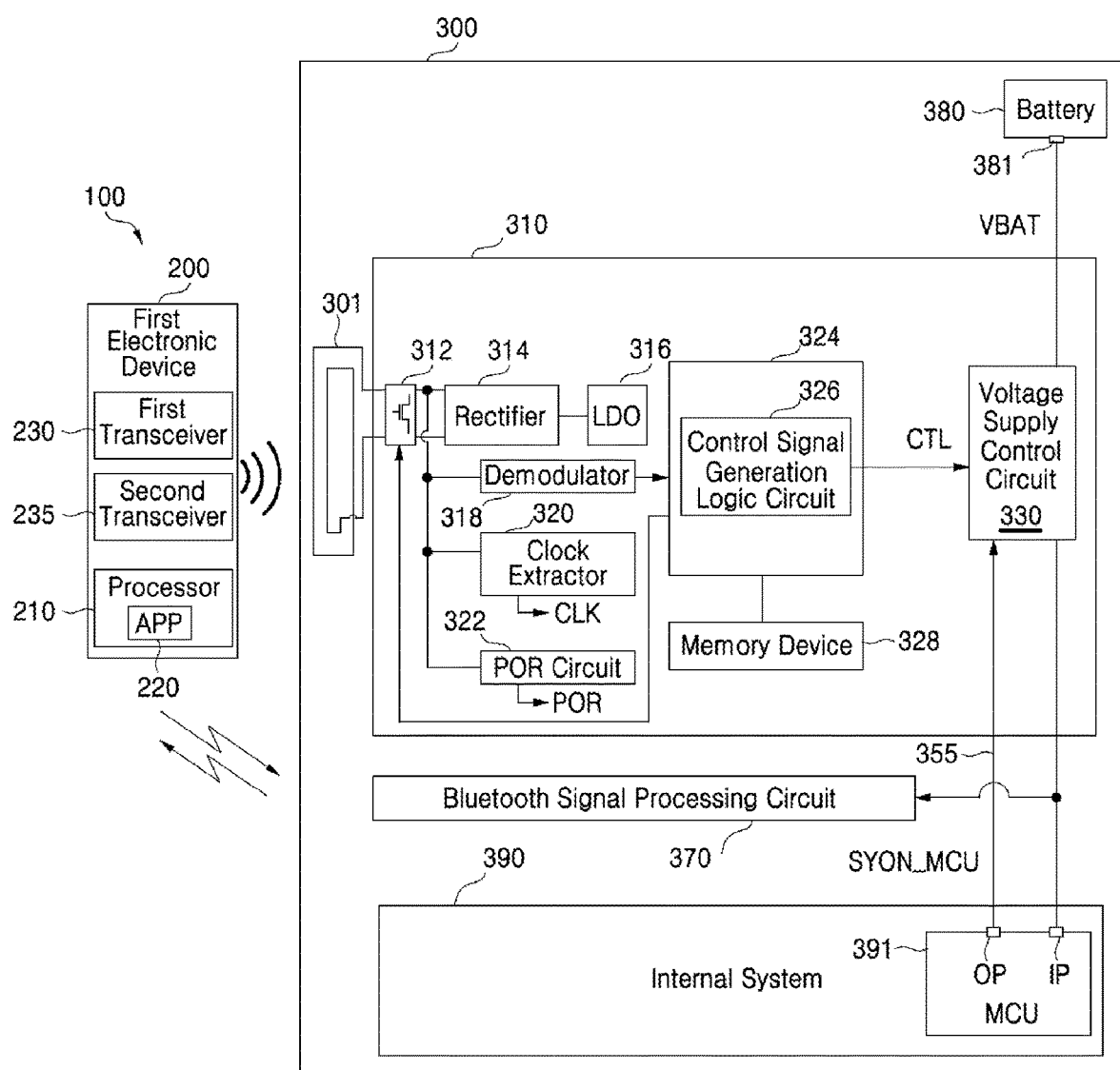
FIG. 1 is a block diagram of a data processing system, which includes a monitoring system that is powered on in response to a radio frequency (RF) signal without including a power switch, according to an embodiment of the inventive concept.

FIG. 1 is a block diagram of a data processing system, which includes a monitoring system that is powered on in response to a radio frequency (RF) signal without including a power switch, according to an embodiment of the inventive concept.

Referring to FIG. 1, a data processing system 100 may include a first electronic device 200 and a second electronic device 300. The first electronic device 200 may correspond to a smartphone having a near field communication (NFC) function, an NFC reader, or an electronic device (e.g., a mobile device) including an NFC reader or an NFC function.

The second electronic device 300 may correspond to a healthcare device, a blood glucose meter capable of measuring blood sugar, an oxygen saturation meter capable of measuring oxygen saturation in the blood, a biometric sensor or wearable biometric sensor capable of measuring biometric information, such as a body temperature, a heart rate, or breathing, a continuous glucose monitoring (CGM)

system, or an electronic device capable of communicating with the first electronic device 200 by using an RF signal.

According to embodiments, each of the first and second electronic devices 200 and 300 may have both an NFC function and a Bluetooth communication function. For example, even when the second electronic device 300 includes a Bluetooth signal processing circuit 370, the second electronic device 300 may be referred to as an NFC device or a Bluetooth device.

The second electronic device 300 may correspond to an information monitoring system or information management system, which includes a passive NFC tag circuit 310 (which may also be referred to as an "NFC device" or an "NFC chip").

According to embodiments, the passive NFC tag circuit 310 may correspond to an integrated circuit (IC), an application-specific IC (ASIC), a semiconductor chip including an IC or an ASIC, or an electronic tag chip.

For example, the second electronic device 300 may correspond to a disposable electronic device that may not be recycled when a battery 380 included in the second electronic device 300 expires. For example, the second electronic device 300 may correspond to a real-time CGM system, which estimates a blood sugar level by inserting a probe (or a sensor) into the tissue fluid in the skin and measuring glucose in the tissue fluid.

The first electronic device 200 may power the second electronic device 300 having a powerp-off state on using an RF signal (e.g., an NFC signal in the 13.56 MHz band).

Because the second electronic device 300 does not include a physical component (e.g., a button or a switch) for power-on and power-off, the user of the second electronic device 300 may not forcibly power off the second electronic device 300, which has been powered on, until the battery 380 expires.

That the second electronic device 300 is powered on (or woken up) by the first electronic device 200 may mean that a battery voltage VBAT of the battery 380 of the second electronic device 300 is supplied as an operating voltage of an internal system 390 (which may also be referred to as an "electronic circuit" or a "sensor system") of the second electronic device 300 that is in a power-off state.

The first electronic device 200 may include a processor 210, which executes an application (or a mobile application) 220, and a first transceiver 230 capable of exchanging RF signals with the second electronic device 300 through NFC. According to embodiments, the first electronic device 200 may further include a second transceiver 235 capable of exchanging RF signals with the second electronic device 300 through Bluetooth (or Bluetooth Low Energy (BLE)) communication.

The application 220 may refer to an application program that is designed to directly perform a particular function on a user or, in some cases, on another application program. The operations of the application 220 are described in detail with reference to FIG. 3 below.

The second electronic device 300 may include an antenna 301, a passive NFC tag circuit 310, a battery 380, and an internal system 390. According to embodiments, the second electronic device 300 may further include the Bluetooth signal processing circuit 370 that may exchange information with the first electronic device 200 through Bluetooth communication. The Bluetooth signal processing circuit 370 may collectively refer to electronic circuits including an antenna, a transceiver, and a processor that processes a signal that has been processed by the transceiver or a signal to be processed by the transceiver.

The elements (301, 310, 380, and 390 (and 370 in some embodiments)) of the second electronic device 300 may be protected by a housing.

From the perspective of the second electronic device 300, the second electronic device 300 includes the battery 380 that provides power, i.e., the battery voltage VBAT, to the internal system 390 thereof.

However, from the perspective of the passive NFC tag circuit 310, the passive NFC tag circuit 310 may not exchange NFC signals with the first electronic device 200 by using the battery voltage VBAT of the battery 380 but may generate an operating voltage using only an NFC signal transmitted from the first electronic device 200.

For example, the internal system 390 may correspond to a CGM system and also a biosensor system including a biosensor for the analysis combining a biological element with a physicochemical sensor.

The housing may refer to a case or a part (i.e., a protective frame) which covers the sensitive elements (301, 310, 380, and 390 (and 370 in some embodiments)) to protect the sensitive elements, wherein the sensitive elements are highly likely to cause problems when the second electronic device 300 contacts the outside in any way. The second electronic device 300 may be waterproof to an IP68 rating or the like due to a waterproof material included in the housing.

According to embodiments, any external device (for example, a power button or a power switch), which may control the battery voltage VBAT of the battery 380 to be supplied to the internal system 390, is not mounted on the outside of the second electronic device 300 that is completely covered with the housing.

Accordingly, unless the second electronic device 300 receives a system power-on NFC signal including a system power-on command from the first electronic device 200, the user of the second electronic device 300 may not enable the battery voltage VBAT of the battery 380 to be supplied to the internal system 390 that is in a power-off state.

The second electronic device 300 may exchange RF signals (e.g., NFC signals or RF identification (RFID) signals) with the first transceiver 230 of the first electronic device 200 through the antenna 301. For example, the antenna 301 may correspond to a coil antenna or a loop antenna.

The passive NFC tag circuit 310 may receive a system power-on command included in a system power-on NFC signal (which may also be referred to as an "NFC signal") transmitted from the first electronic device 200. After the passive NFC tag circuit 310 electrically connects a voltage output terminal 381 of the battery 380 to a voltage input terminal IP of the internal system 390 in response to the system power-on command, the passive NFC tag circuit 310 may maintain the electrical connection between the voltage output terminal 381 of the battery 380 and the voltage input terminal IP of the internal system 390 (specifically, until the battery 380 expires) by using the battery voltage VBAT though the passive NFC tag circuit 310 does not receive any NFC signal or Bluetooth signal from the first electronic device 200 afterward.

The passive NFC tag circuit 310 performs only a function of controlling the electrical connection between the voltage output terminal 381 of the battery 380 and the voltage input terminal IP of the internal system 390. The second electronic device 300 may generate a voltage, which is necessary for the element, i.e., the passive NFC tag circuit 310, to operate, by using only an NFC signal, which is transmitted from the first electronic device 200, not the battery voltage VBAT.

The passive NFC tag circuit 310 may include a modulator 312, a rectifier 314, a regulator 316, a demodulator 318, a clock extractor 320, a power-on reset (POR) circuit 322, an NFC microcontroller unit (MCU) 324 called an NFC control logic circuit, a memory device 328, and a voltage supply control circuit 330. Elements that generate a control signal CTL by using an NFC signal from the first electronic device 200 may be referred to as an NFC interface.

A transceiver circuit (or a modem) may include the modulator 312 and the demodulator 318. The transceiver circuit may receive an RF signal from the first electronic device 200, demodulate the RF signal, and transmit a demodulated signal to the NFC MCU 324. The transceiver circuit may also generate an RF signal by modulating a signal from the NFC MCU 324 and transmit the RF signal to the first electronic device 200.

The antenna 301 may receive a 13.56 MHz NFC signal emitted by the first transceiver 230. According to an embodiment, a limiter (not shown) may be used between the antenna 301 and the modulator 312 to prevent the output voltage of the antenna 301 from being too large.

To extract an operating voltage of the passive NFC tag circuit 310, the output voltage of the antenna 301 may be supplied to the rectifier 314. The regulator 316 may generate a direct current (DC) voltage (or a constant voltage) by using (or regulating) a voltage rectified by the rectifier 314. For example, the regulator 316 may correspond to a linear regulator. The regulator 316 may correspond to a low-dropout (LDO) regulator.

When the output voltage of the antenna 301 becomes sufficiently large, a POR signal POR may be generated by the POR circuit 322. The POR signal POR may activate an element or elements (e.g., 324 and/or 328) of a digital circuit and at least one of the elements (e.g., 312, 314, 318, 320, and 322) of an analog front end (AFE).

The clock extractor 320 may extract, from the output voltage of the antenna 301, a clock (or a clock signal) CLK for the element(s) (324 and/or 328) of the digital circuit. Accordingly, the passive NFC tag circuit 310 operates in synchronization with an NFC signal transmitted from the first electronic device 200.

The demodulator 318 may demodulate data or information from an NFC signal transmitted from the first electronic device 200. For example, the demodulator 318 may demodulate an NFC signal from the first electronic device 200 by using an envelope detector and transmit a demodulated signal (e.g., a demodulated digital signal) to the NFC MCU 324.

The modulator 312 may transmit data from the NFC MCU 324 to the first electronic device 200. According an embodiment, the modulator 312 may modulate data from the NFC MCU 324 by using load modulation and transmit a modulated NFC signal to the first electronic device 200 through the antenna 301.

Figure 2:
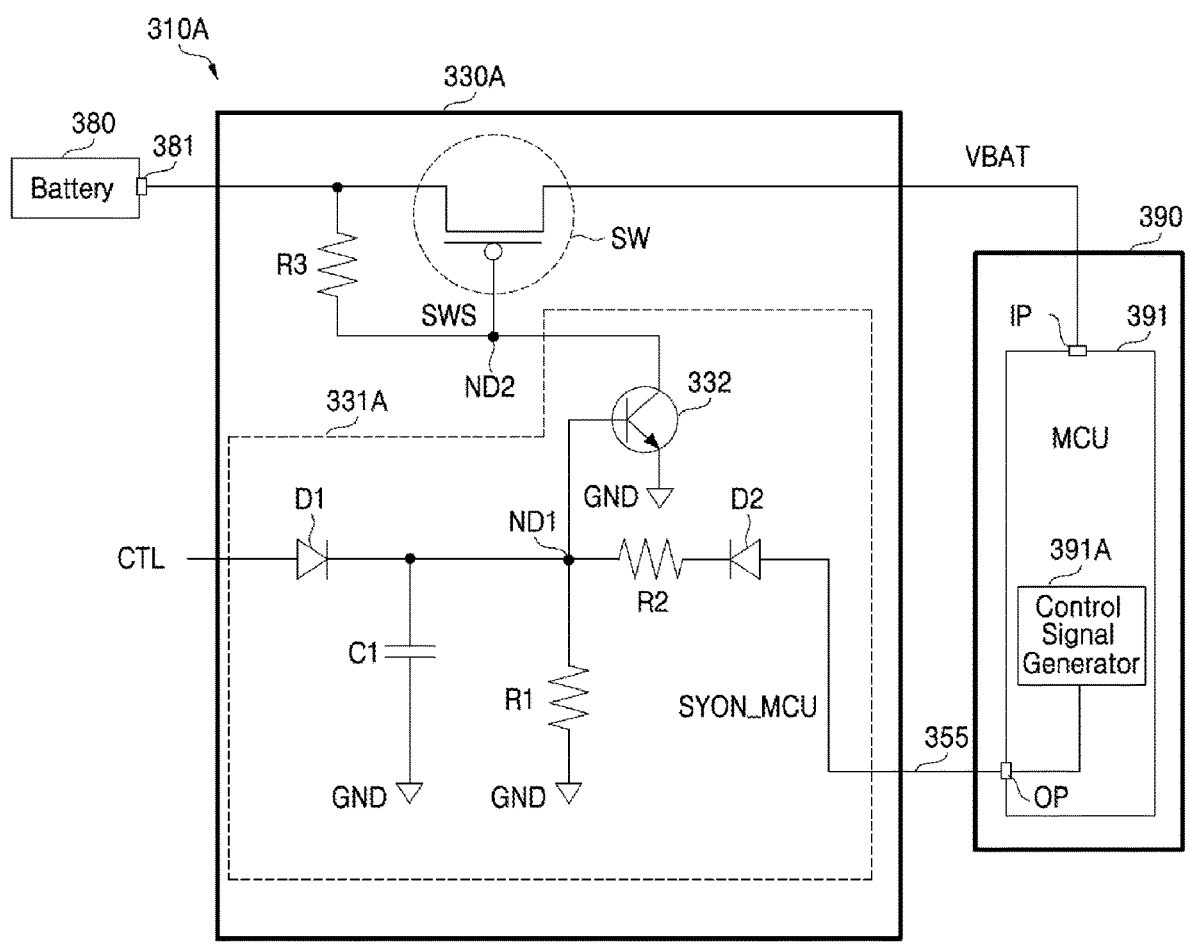
FIG. 2 is a circuit diagram of an example of a passive near field communication (NFC) tag circuit in FIG. 1, according to an embodiment.

FIG. 2 is a circuit diagram of a passive NFC tag circuit as an example of the passive NFC tag circuit in FIG. 1. For convenience of description, the passive NFC tag circuit 310A is illustrated together with a voltage supply control circuit 330A, the battery 380, and the internal system 390. The passive NFC tag circuit 310A may be an embodiment of the passive NFC tag circuit 310 in FIG. 1 and the voltage supply control circuit 330A may be an embodiment of the voltage supply control circuit 330 in FIG. 1.

Referring to FIGS. 1 and 2, the NFC MCU 324 may decode a system power-on command, which is included in a system power-on signal demodulated by the demodulator 318, generate the control signal CTL corresponding to a result of the decoding, and transmit the control signal CTL to the voltage supply control circuit 330A. For example, the control signal CTL may correspond to a 1-bit signal (e.g., a voltage related to a voltage regulated by the regulator 316) but is not limited thereto. For example, the control signal CTL may be in a first state or a second state.

The NFC MCU 324 may include a control signal generation logic circuit 326. Although it is illustrated in FIG. 1 that the NFC MCU 324 includes the control signal generation logic circuit 326, the control signal generation logic circuit 326 may be provided outside the NFC MCU 324 according to embodiments. For example, the control signal generation logic circuit 326 may generate the control signal CTL in response to (or by decoding) a system power-on command, which is included in a system power-on signal demodulated by the demodulator 318.

In response to the control signal CTL in the first state, which has been generated by the control signal generation logic circuit 326, the voltage supply control circuit 330A may connect the voltage output terminal 381 of the battery 380 to the voltage input terminal IP of the internal system 390 to power on the internal system 390 that has been in a power-off state.

Thereafter, the internal system 390 that is finally powered on using the battery voltage VBAT may output a voltage maintaining signal SYON_MCU in a first state and the voltage supply control circuit 330A may receive the voltage maintaining signal SYON_MCU in the first state through a voltage maintaining signal transmission line 355. In response to the voltage maintaining signal SYON_MCU in the first state, the voltage supply control circuit 330A may maintain the connection between the voltage output terminal 381 of the battery 380 and the voltage input terminal IP of the internal system 390 to maintain the power-on state of the internal system 390.

Here, the first state may correspond to a first level or a high level and the second state may correspond to a second level or a low level.

When voltage drop by the voltage supply control circuit 330A is not considered, it is assumed that an output voltage of the voltage supply control circuit 330A is the same as the battery voltage VBAT.

The memory device 328 may store a unique identifier (UID) that may uniquely identify the second electronic device 300. The memory device 328 may include non-volatile memory device such as electrically erasable programmable read-only memory (EEPROM).

The voltage supply control circuit 330A may include a switch circuit SW, a third resistor R3, and a switch circuit control circuit 331A.

The switch circuit SW may be connected between the voltage output terminal 381 of the battery 380 and the voltage input terminal IP of the internal system 390. The switch circuit SW may control the connection between the voltage output terminal 381 and the voltage input terminal IP in response to a voltage, e.g., a switch control signal SWS, of a second node ND2. For example, the switch circuit SW may correspond to a p-channel metal-oxide semiconductor field-effect transistor (PMOSFET).

The third resistor R3 may be connected between the voltage output terminal 381 and the second node ND2. The third resistor R3 may pull the voltage of the second node ND2 up to a battery voltage level or down to a ground GND.

The switch circuit control circuit 331A may determine the voltage of the second node ND2, e.g., the state of the switch control signal SWS, based on (or by using) the control signal CTL and the voltage maintaining signal SYON_MCU. The switch circuit control circuit 331A may include a first diode D1, a first capacitor C1, a first resistor R1, a second resistor R2, a second diode D2, and a transistor 332.

The first diode D1, which is an example of a unidirectional current control element, may transmit the control signal CTL to a first node ND1. The first capacitor C1 may be connected between the first node ND1 and the ground GND. The first resistor R1 may be connected between the first node ND1 and the ground GND. The second resistor R2 and the second diode D2 may be connected in series to each other between the first node ND1 and a signal output terminal OP.

The first diode D1 may block the voltage maintaining signal SYON_MCU from being provided toward the control signal generation logic circuit 326. The second diode D2 may block the control signal CTL from being provided toward the signal output terminal OP.

The control terminal of the transistor 332 may be connected to the first node ND1. The first terminal of the transistor 332 may be connected to the second node ND2. The second terminal of the transistor 332 may be connected to the ground GND.

According to an embodiment, when the transistor 332 is an n-type (e.g., a npn) bipolar junction transistor (BJT), the control terminal of the transistor 332 may correspond to a base, the first terminal thereof may correspond to a collector, and the second terminal thereof may correspond to an emitter. According to an embodiment, the transistor 332 may correspond to an n-channel MOSFET (NMOSFET).

The internal system 390 may include a control signal generator 391A, which generates the voltage maintaining signal SYON_MCU by using only the battery voltage VBAT. According to embodiments, the control signal generator 391A may be located (or layouted) inside or outside an MCU 391.

Figure 3:
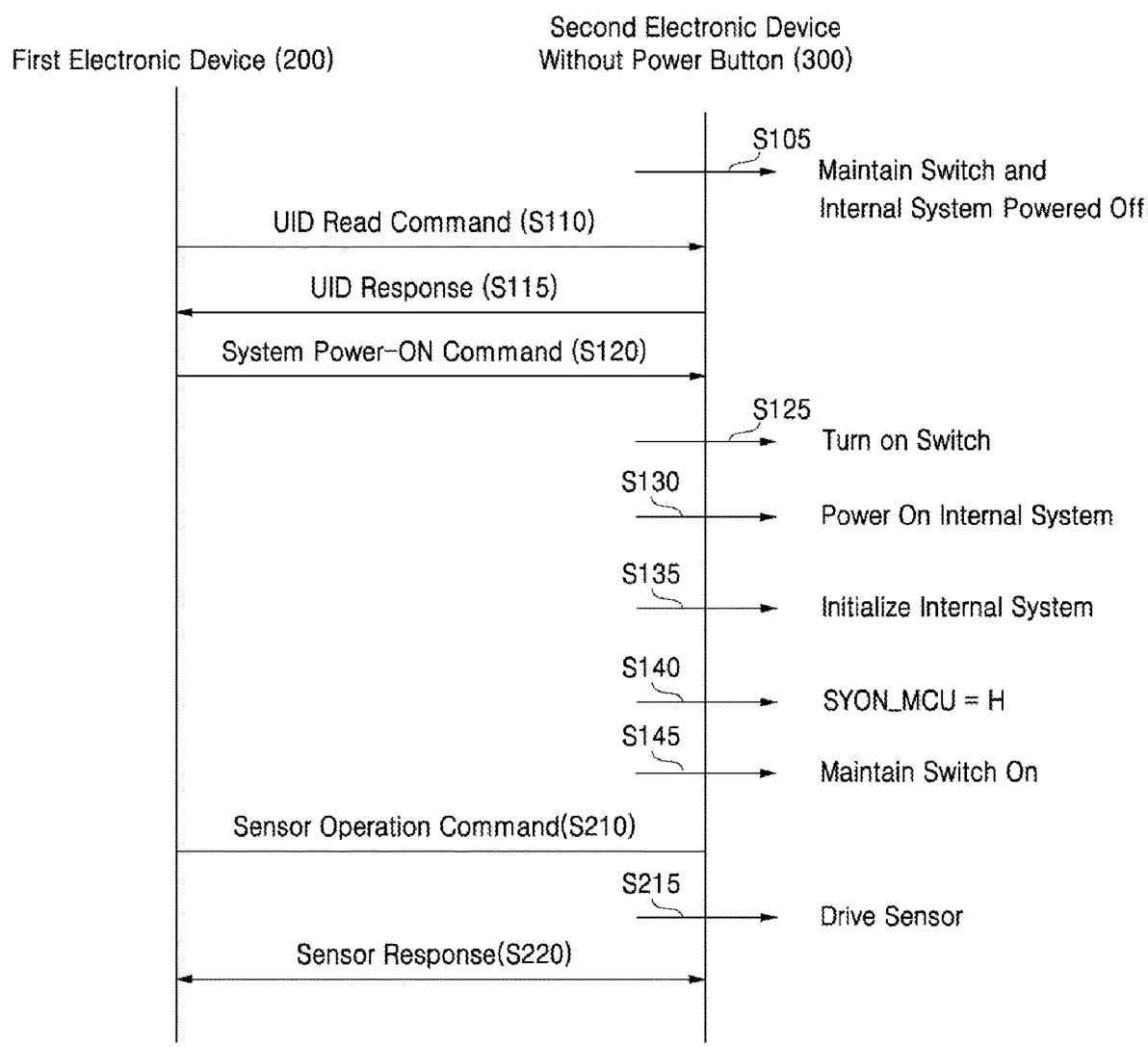
FIG. 3 illustrates a data flow in an operating method of the data processing system of FIG. 1.
Figure 4:
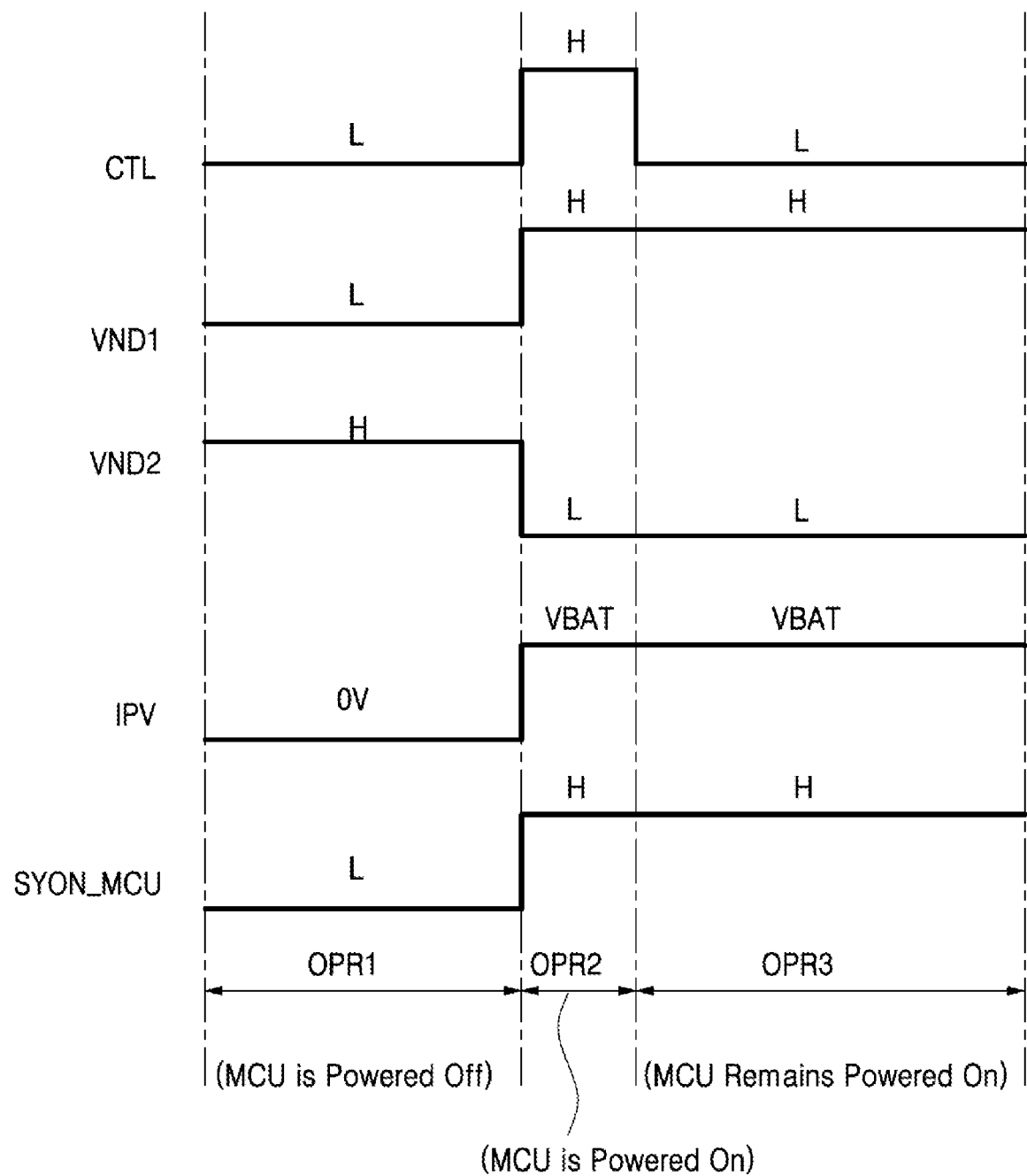
FIG. 4 is a timing diagram of signals in the operation of the passive NFC tag circuit of FIG. 2.

FIG. 3 illustrates a data flow in an operating method of the data processing system of FIG. 1. FIG. 4 is a timing diagram of signals in the operation of the passive NFC tag circuit of FIG. 2.

Although signals, e.g., CTL, VND1, VND2, IPV, and SYON_MCU, are expressed as digital signals in FIG. 4 for convenience of description, at least one of the signals may refer to an analog signal.

The operations of the second electronic device 300 in a first operation mode OPR1 are described with reference to FIGS. 1 to 4.

In the first operation mode OPR1, the second electronic device 300 may not receive any RF signal (e.g., NFC signal) from the first electronic device 200 when the second electronic device 300 is located outside a communication range from the first electronic device 200. In other words, the second electronic device 300 may not be provided with RF power (which may also be referred to as energy) by an RF signal from the first electronic device 200.

In the first operation mode OPR1, the output voltage of each of the rectifier 314 and the regulator 316 may be 0 V because the second electronic device 300 is not provided with RF power by an RF signal from the first electronic device 200.

The control signal generation logic circuit 326 may generate the control signal CTL having a second state L (e.g., a low level L or a ground voltage level), and accordingly, a voltage VND1 of the first node ND1 may have the second state L. At this time, the voltage maintaining signal SYON_MCU may be in the second state L.

Because an n-type BJT, i.e., the transistor 332, remains in an off-state, a voltage VND2 of the second node ND2 has a first state H (e.g., VBAT). Because the switch circuit SW, e.g., a PMOSFET, remains in an off-state, a voltage IPV of the voltage input terminal IP may be 0 V, and accordingly, the internal system 390 may remain in a power-off state in operation S105.

The operation of the second electronic device 300 in a second operation mode OPR2 is described with reference to FIGS. 1 to 4. For example, the second electronic device 300 may perform NFC with the first electronic device 200 when the second electronic device 300 is located inside the communication range from the first electronic device 200.

In the second operation mode OPR2, the application 220 of the first electronic device 200 may transmit a UID read NFC signal including a UID read command to the second electronic device 300 through the first transceiver 230 in operation S110.

In the second operation mode OPR2, the second electronic device 300 may be provided with RF power by an RF signal from the first electronic device 200, and accordingly, the rectifier 314 may generate a rectified voltage by rectifying the UID read NFC signal, which is received through the antenna 301. The regulator 316 may regulate the rectified voltage and transmit a regulated voltage to at least one of the elements (e.g., 318, 320, 322, 324, and 328) of the second electronic device 300.

The demodulator 318 may receive the UID read NFC signal through the antenna 301, demodulate the UID read NFC signal, and transmit a demodulated UID read signal to the NFC MCU 324.

The NFC MCU 324 or the control signal generation logic circuit 326 may decode the UID read command included in the demodulated UID read signal, generate the control signal CTL having the second state L according to a result of the decoding, read a UID from the memory device 328, and transmit a UID response including the UID to the modulator 312.

The modulator 312 may modulate the UID response including the UID of the second electronic device 300 and transmit a UID response NFC signal to the first transceiver 230 of the first electronic device 200 in operation S115.

Because the control signal CTL is in the second state L, the voltage VND1 of the first node ND1 may remain in the second state L and the voltage VND2 of the second node ND2 may remain in the first state H, and accordingly, the switch circuit SW corresponding to the PMOSFET may remain in the off-state.

Only when the application 220 of the first electronic device 200 receives the UID response NFC signal through the first transceiver 230, the application 220 may generate a system power-on NFC signal including a system power-on command and transmit the system power-on NFC signal to the antenna 301 of the second electronic device 300 through the first transceiver 230 in operation S120.

In the second operation mode OPR2, because the second electronic device 300 is provided with the RF power by the RF signal from the first electronic device 200, the rectifier 314 may generate a rectified voltage by rectifying the system power-on NFC signal received through the antenna 301. The regulator 316 may regulate the rectified voltage and transmit a regulated voltage to at least one of the elements (e.g., 318, 320, 322, 324, and 328) of the second electronic device 300.

The demodulator 318 may receive the system power-on NFC signal through the antenna 301, demodulate the system power-on NFC signal, and transmit a demodulated system power-on NFC signal to the NFC MCU 324.

The NFC MCU 324 or the control signal generation logic circuit 326 may decode the system power-on NFC command included in the demodulated system power-on NFC signal, generate the control signal CTL having the first state H according to a result of the decoding, and transmit the control signal CTL having the first state H to the voltage supply control circuit 330A.

When the control signal CTL is in the first state H, the voltage VND1 of the first node ND1 may be in the first state H, and accordingly, the n-type BJT, i.e., the transistor 332, may be turned on. The voltage VND2 of the second node ND2 may be pulled down to the ground level of the n-type BJT, i.e., the transistor 332, which has been turned on, and accordingly, the switch circuit SW, i.e., the PMOSFET, may be turned on in response to the switch control signal SWS having the second state L in operation S125. As a result, the battery voltage VBAT may be finally supplied to the voltage input terminal IP through the switch circuit SW that has been turned on. Accordingly, the voltage IPV of the voltage input terminal IP may become the battery voltage VBAT.

As the battery voltage VBAT is supplied to the voltage input terminal IP of the internal system 390, the internal system 390 may transit or change from a power-off state to a power-on state in operation S130 and perform initialization based on the battery voltage VBAT in operation S135.

The control signal generator 391A may generate the voltage maintaining signal SYON_MCU, which transits from the second state L to the first state H, by using the battery voltage VBAT and transmit the voltage maintaining signal SYON_MCU having the first state H to the voltage supply control circuit 330A through the voltage maintaining signal transmission line 355 in operation S140.

When at least one of the control signal CTL and the voltage maintaining signal SYON_MCU is in the first state H, the switch circuit SW may remain turned on in operation S145.

The operation of the second electronic device 300 in a third operation mode OPR3 is described with reference to FIGS. 1 to 4.

Although the second electronic device 300 does not receive any RF signal (e.g., NFC signal) from the first electronic device 200 when the second electronic device 300 is outside the communication range from the first electronic device 200, the battery voltage VBAT may be continuously supplied to the internal system 390 by the voltage supply control circuit 330A in the third operation mode OPR3.

In the third operation mode OPR3, when the second electronic device 300 is not provided with RF power by an RF signal from the first electronic device 200, the output voltage of each of the rectifier 314 and the regulator 316 may be 0 V.

Although the NFC MCU 324 or the control signal generation logic circuit 326 generates the control signal CTL having the second state L, the voltage VND1 of the first node ND1 is maintained in the first state H because the voltage maintaining signal SYON_MCU is maintained in the first state H. Accordingly, the n-type BJT, i.e., the transistor 332, may be maintained turned on, and therefore, the voltage VND2 of the second node ND2 may be maintained in the second state L and the switch circuit SW may also be maintained turned on.

Because the switch circuit SW is maintained turned on, the battery voltage VBAT may be continuously supplied to the internal system 390.

Figure 5:
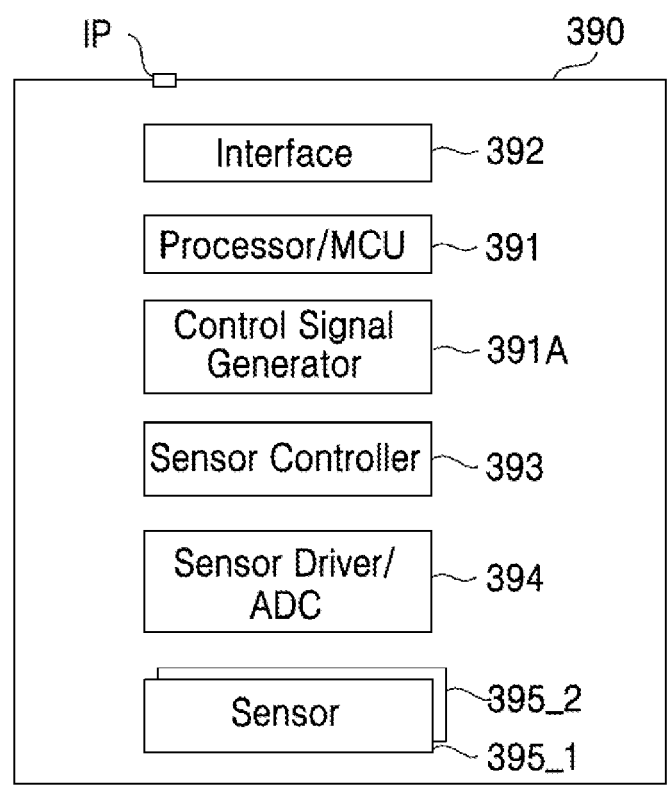
FIG. 5 is a block diagram of an internal system in FIG. 1, according to an embodiment.

FIG. 5 is a block diagram of the internal system in FIG. 1, according to an embodiment.

The internal system 390 of FIG. 5 is an embodiment of the internal system 390 in FIG. 1. The internal system 390 may include a processor (which may be referred to as an MCU) 391, a control signal generator 391A, an interface 392, a sensor controller 393, a signal processing circuit 394 including a sensor driver and an analog-to-digital converter (ADC), and one or more sensors, e.g., a first sensor 395_1 and/or a second sensor 395_2. For example, the first sensor 395_1 and/or second sensors 395_2 may include a continuous invasive glucose sensor or a continuous non-invasive glucose sensor.

Referring to FIGS. 1 to 5, after the second operation mode OPR2, that is, after the internal system 390 transits or changes from a power-off state to a power-on state as the battery voltage VBAT is supplied to the internal system 390, the application 220 of the first electronic device 200 may transmit a sensor operation signal including a sensor operation command to the second electronic device 300 through the second transceiver 235 in operation S210.

Because the second electronic device 300 is provided with power by the sensor operation signal from the first electronic device 200, the Bluetooth signal processing circuit 370 may generate a first sensor control signal for controlling the operation of at least one of the first and second sensors 395_1 and 395_2 according to the sensor operation signal received through an antenna of the Bluetooth signal processing circuit 370 and may transmit the first sensor control signal to the interface 392 of the internal system 390. The antenna of the Bluetooth signal processing circuit 370 may be the same as or different from the antenna 301.

As described above, because the battery voltage VBAT is being supplied to the voltage input terminal IP of the internal system 390 through the switch circuit SW, the internal system 390 is in operation.

The processor (or MCU) 391 may receive the first sensor control signal through the interface 392, interpret the first sensor control signal, generate a second sensor control signal corresponding to a result of the interpretation, and transmit the second sensor control signal to the sensor controller 393.

The sensor controller 393 may receive and interpret (or analyse) the second sensor control signal and transmit a sensor driving signal corresponding to a result of the interpretation to the sensor driver included in the signal processing circuit 394. The sensor driver may drive at least one of the first and second sensors 395_1 and 395_2 by using the sensor driving signal in operation S215.

For example, the first sensor 395_1 may correspond to a glucose sensor, a CGM sensor, or a biosensor and the second sensor 395_2 may correspond to a temperature sensor, but embodiments are not limited thereto.

The ADC of the signal processing circuit 394 may receive a sensed analog signal from at least one of the first and second sensors 395_1 and 395_2, convert the sensed analog signal into a first digital signal, and transmit the first digital signal to the sensor controller 393.

The sensor controller 393 may generate a second digital signal corresponding to the first digital signal and transmit the second digital signal to the processor (or MCU) 391. The processor (or MCU) 391 may generate a sensor response corresponding to the second digital signal and transmit the sensor response to the Bluetooth signal processing circuit 370 through the interface 392.

The Bluetooth signal processing circuit 370 may process and transmit the sensor response to the second transceiver 235 of the first electronic device 200 through the antenna in operation S220. The application 220 of the first electronic device 200 may receive and process the sensor response received through the second transceiver 235.

Figure 6:
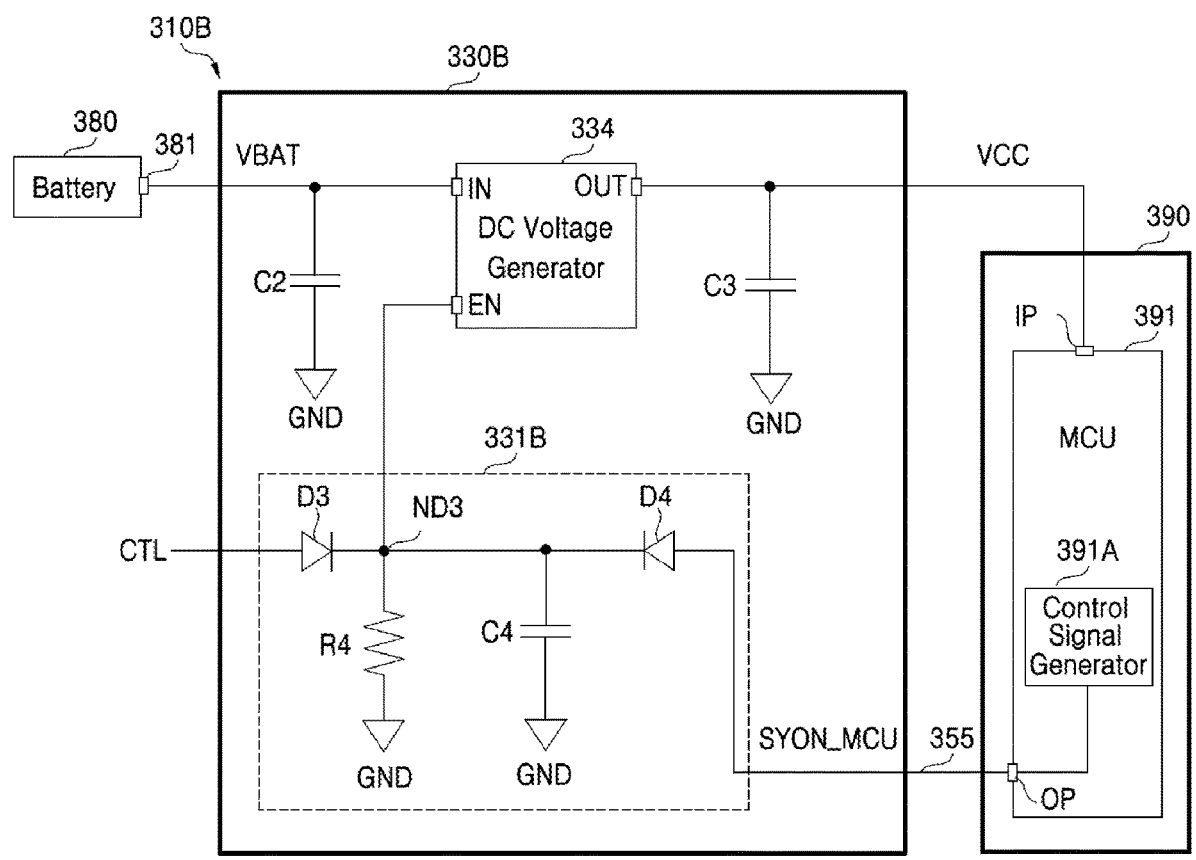
FIG. 6 is a circuit diagram of another example of the passive NFC tag circuit in FIG. 1, according to some embodiments.

FIG. 6 is a circuit diagram of a passive NFC tag circuit as another example of the passive NFC tag circuit in FIG. 1. For convenience of description, a passive NFC tag circuit 310B is illustrated together with a voltage supply control circuit 330B, a battery 380, and an internal system 390. The passive NFC tag circuit 310B may be an embodiment of the passive NFC tag circuit 310 in FIG. 1 and the voltage supply control circuit 330B may be an embodiment of the voltage supply control circuit 330 in FIG. 1.

The voltage supply control circuit 330B may include a second capacitor C2, a third capacitor C3, an enable signal generation circuit 331B, and a DC voltage generator 334. For example, the DC voltage generator 334 may generate a DC voltage VCC by using the battery voltage VBAT. The DC voltage generator 334 may correspond to an LDO regulator or a DC-DC converter but is not limited thereto. According to embodiments, a DC power supply, which generates the DC voltage VCC (or the battery voltage VBAT), may refer to the battery 380 or the DC voltage generator 334.

The voltage output terminal 381 of the battery 380 may be connected to an input terminal IN of the DC voltage generator 334. The second capacitor C2 may be connected between the input terminal IN and the ground GND.

An output terminal OUT of the DC voltage generator 334 may be connected to the voltage input terminal IP of the internal system 390. The third capacitor C3 may be connected between the output terminal OUT and the ground GND.

The enable signal generation circuit 331B may control the DC voltage generator 334 to be enabled or disabled in response to at least one of the control signal CTL and the voltage maintaining signal SYON_MCU. An enable terminal EN of the DC voltage generator 334 may be connected to a third node ND3. Only when a signal input to the enable terminal EN is in a first state (or at a high level), the DC voltage generator 334 may be enabled to generate the DC voltage VCC.

The enable signal generation circuit 331B may include a third diode D3 transmitting the control signal CTL to the third node ND3, a fourth resistor R4 connected between the third node ND3 and the ground GND, a fourth capacitor C4 connected between the third node ND3 and the ground GND, and a fourth diode D4 transmitting the voltage maintaining signal SYON_MCU to the third node ND3.

The fourth diode D4 may block the control signal CTL from being provided toward the signal output terminal OP. The third diode D3 may block the voltage maintaining signal SYON_MCU from being provided toward the NFC MCU 324.

Figure 7:
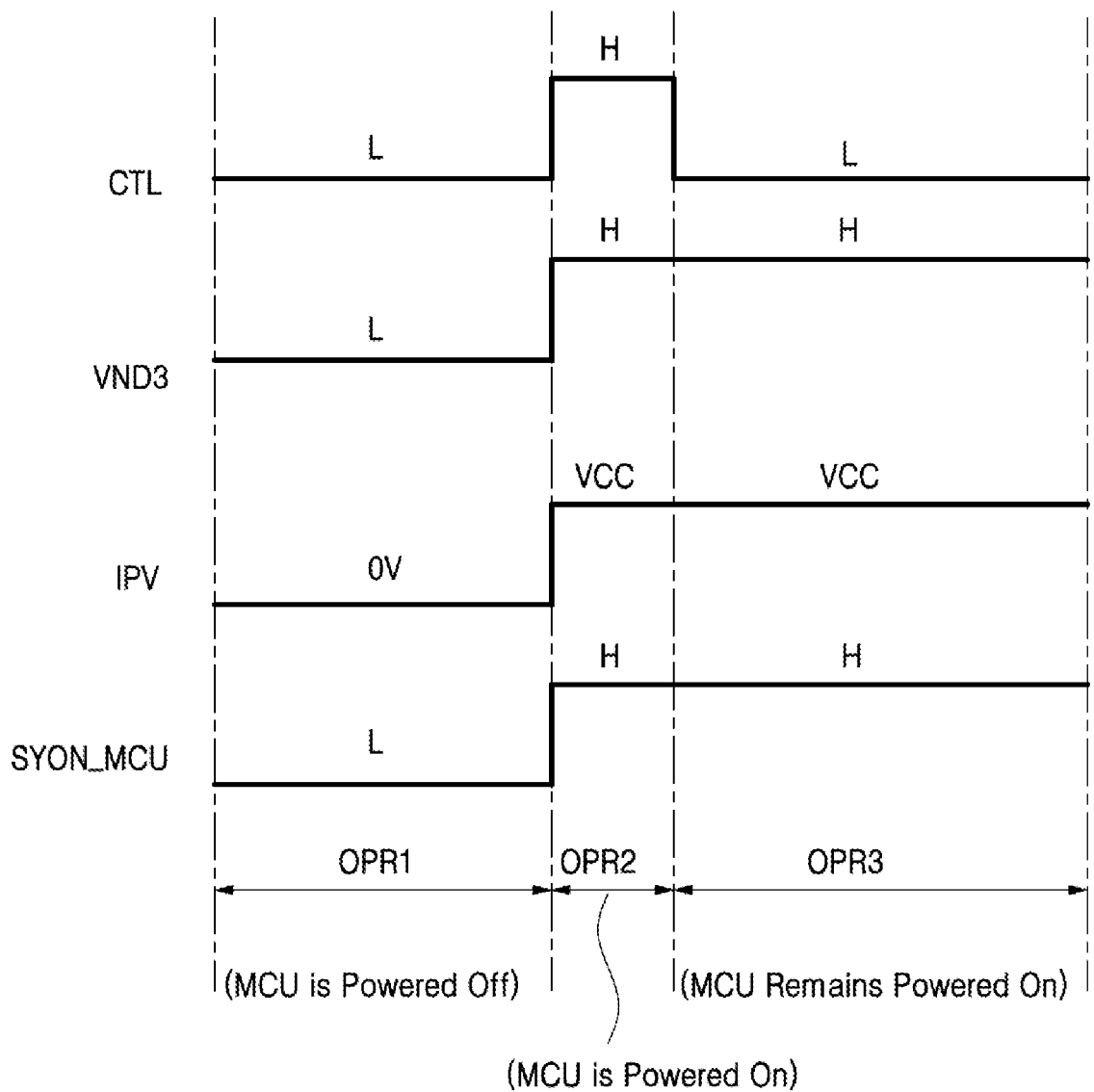
FIG. 7 is a timing diagram of signals in the operation of the passive NFC tag circuit of FIG. 6.

FIG. 7 is a timing diagram of signals in the operation of the passive NFC tag circuit of FIG. 6. Although signals, e.g., CTL, VND3, IPV, and SYON_MCU, are expressed as digital signals in FIG. 7 for convenience of description, at least one of the signals may refer to an analog signal.

The operation of the second electronic device 300 in the first operation mode OPR1 is described with reference to FIGS. 1, 3, 6 and 7.

In the first operation mode OPR1, the second electronic device 300 may not receive any RF signal (e.g., NFC signal) from the first electronic device 200 when the second electronic device 300 is located outside a communication range from the first electronic device 200.

In the first operation mode OPR1, the output voltage of each of the rectifier 314 and the regulator 316 may be 0 V because the second electronic device 300 is not provided with RF power by an RF signal from the first electronic device 200.

As described above, because the NFC MCU 324 or the control signal generation logic circuit 326 generates the control signal CTL having the second state L in the first operation mode OPR1, a voltage VND3 of the third node ND3 may have the second state L.

Because the voltage VND3 having the second state L is input to the enable terminal EN of the DC voltage generator 334, the DC voltage generator 334 may be disabled. Because the DC voltage generator 334 supplies a voltage of 0 V to the voltage input terminal IP, the internal system 390 may remain in a power-off state, and accordingly, the voltage maintaining signal SYON_MCU is in the second state L.

The operation of the second electronic device 300 in the second operation mode OPR2 is described with reference to FIGS. 1, 3, 6, and 7.

When the second electronic device 300 is located inside the communication range from the first electronic device 200, the application 220 of the first electronic device 200 may transmit a UID read NFC signal including a UID read command to the second electronic device 300 through the first transceiver 230 in the second operation mode OPR2, in operation S110.

In the second operation mode OPR2, the second electronic device 300 may be provided with RF power by an RF signal from the first electronic device 200, and accordingly, the rectifier 314 may generate a rectified voltage by rectifying the UID read NFC signal, which is received through the antenna 301. The regulator 316 may regulate the rectified voltage and transmit a regulated voltage to at least one of the elements (e.g., 318, 320, 322, 324, and 328) of the second electronic device 300.

The demodulator 318 may receive the UID read NFC signal through the antenna 301, demodulate the UID read NFC signal, and transmit a demodulated UID read signal to the NFC MCU 324.

The NFC MCU 324 or the control signal generation logic circuit 326 may decode the UID read command included in the demodulated UID read signal, generate the control signal CTL having the second state L according to a result of the decoding, read a UID from the memory device 328, and transmit a UID response including the UID to the modulator 312.

The modulator 312 may modulate the UID response including the UID of the second electronic device 300 and transmit a UID response NFC signal to the first transceiver 230 of the first electronic device 200 in operation S115.

Because the control signal CTL is in the second state L, the voltage VND3 of the third node ND3 may remain in the second state L and the DC voltage generator 334 may remain disabled.

Only after the application 220 of the first electronic device 200 receives the UID response NFC signal through the first transceiver 230 and verifies the UID response NFC signal, the application 220 may generate a system power-on NFC signal including a system power-on command and transmit the system power-on NFC signal to the antenna 301 of the second electronic device 300 through the first transceiver 230 in operation S120.

In the second operation mode OPR2, because the second electronic device 300 is provided with the RF power by the RF signal from the first electronic device 200, the rectifier 314 may generate a rectified voltage by rectifying the system power-on NFC signal received through the antenna 301. The regulator 316 may regulate the rectified voltage and transmit a regulated voltage to at least one of the elements (e.g., 318, 320, 322, 324, and 328) of the second electronic device 300.

The demodulator 318 may receive the system power-on NFC signal through the antenna 301, demodulate the system power-on NFC signal, and transmit a demodulated system power-on NFC signal to the NFC MCU 324.

The NFC MCU 324 or the control signal generation logic circuit 326 may decode the system power-on command included in the demodulated system power-on NFC signal, generate the control signal CTL having the first state H according to a result of the decoding, and transmit the control signal CTL having the first state H to the voltage supply control circuit 330B.

Because the voltage VND3 of the third node ND3 transits or changes from the second state L to the first state H when the control signal CTL is in the first state H, the DC voltage generator 334 may be enabled.

Accordingly, the DC voltage generator 334 that has been enabled may generate the DC voltage VCC by using the battery voltage VBAT and supply the DC voltage VCC to the voltage input terminal IP. Accordingly, the voltage IPV of the voltage input terminal IP may be increased to the DC voltage VCC. According to embodiments, the DC voltage VCC may be equal to or lower or higher than the battery voltage VBAT.

The internal system 390 in a power-off state may transit or change to a power-on state by using the DC voltage VCC in operation S130. The internal system 390 may be initialized in operation S135.

The control signal generator 391A may generate the voltage maintaining signal SYON_MCU, which finally has the first state H, by using the DC voltage VCC and transmit the voltage maintaining signal SYON_MCU to the voltage supply control circuit 330B through the voltage maintaining signal transmission line 355 in operation S140.

When the control signal CTL or the voltage maintaining signal SYON_MCU is in the first state H, the DC voltage generator 334 may remain enabled and continuously supply the DC voltage VCC to the voltage input terminal IP in operation S145.

The operation of the second electronic device 300 in the third operation mode OPR3 is described with reference to FIGS. 1, 3, 6, and 7.

Although the second electronic device 300 does not receive any RF signal (e.g., NFC signal) from the first electronic device 200 when the second electronic device 300 is located outside the communication range from the first electronic device 200, the DC voltage generator 334 that remains enabled may supply the DC voltage VCC to the internal system 390 in the third operation mode OPR3.

In the third operation mode OPR3, when the second electronic device 300 is not provided with RF power by an RF signal from the first electronic device 200, the output voltage of each of the rectifier 314 and the regulator 316 may be 0 V.

Although the NFC MCU 324 or the control signal generation logic circuit 326 generates the control signal CTL having the second state L, the voltage VND3 of the third node ND3 is maintained in the first state H because the voltage maintaining signal SYON_MCU is maintained in the first state H by the internal system 390 in the power-on state. Accordingly, the DC voltage generator 334 that remains enabled may generate and continuously supply the DC voltage VCC to the internal system 390.

The second electronic device 300 may generate the control signal CTL in response to an RF signal (e.g., an NFC signal), supply the DC voltage (e.g., VBAT or VCC) of a DC power supply (e.g., 380 or 334) to an electronic circuit (e.g., 390), which is in a power-off state, in response to the control signal CTL, and initialize the electronic circuit (e.g., 390) that has been powered on by the DC voltage (e.g., VBAT or VCC). The electronic circuit (e.g., 390) may generate the voltage maintaining signal SYON_MCU. In response to the voltage maintaining signal SYON_MCU, the DC voltage (e.g., VBAT or VCC) may be continuously supplied to the electronic circuit (e.g., 390) so that the electronic circuit (e.g., 390) remains in a power-on state.

The second electronic device 300 may collect biometric information by using the electronic circuit (e.g., 390) (for example, at least one of the first and second sensors 395_1 and 395_2), which has been powered on by the DC voltage (e.g., VBAT or VCC), and may control processing (e.g., analog-to-digital conversion, modulation, etc.) or communication (whether to transmit processed biometric information through NFC or Bluetooth) for the transmission of the collected biometric information to the first electronic device 200. According to an embodiment, the first electronic device 200 may have at least one of the NFC function and the Bluetooth communication function.

According to the embodiments of the inventive concept, though not having a power button, an electronic device may finally supply the DC voltage of a DC power supply thereof to an internal system thereof in response to an RF signal transmitted from an external electronic device and then maintain the supply of the DC voltage to the internal system without receiving a separate RF signal form the external electronic device thereafter.

What is claimed is:

1. A near field communication (NFC) device comprising:
a DC power supply configured to output a DC voltage;
an NFC interface configured to generate a control signal in response to an NFC signal; and
a voltage supply control circuit configured to supply the DC voltage to an electronic circuit in response to the control signal and maintain supply of the DC voltage to the electronic circuit in response to a voltage maintaining signal generated by the electronic circuit powered on by the DC voltage.

2. The NFC device of claim 1, wherein the DC power supply includes a battery, and the voltage supply control circuit includes a switch circuit configured to be turned on in response to the control signal, supply the DC voltage to the electronic circuit, and remain turned on in response to the voltage maintaining signal.

3. The NFC device of claim 1, further comprising a battery,
wherein the DC power supply is further configured to be enabled in response to the control signal, generate the DC voltage by using a battery voltage of the battery, and remain enabled in response to the voltage maintaining signal.

4. The NFC device of claim 3, wherein the DC power supply includes a low-dropout (LDO) regulator.

5. The NFC device of claim 3, wherein the DC power supply includes a DC-DC converter.

6. An electronic device comprising:
an electronic circuit including a main controller unit; and
a near field communication (NFC) tag circuit,
wherein the NFC tag circuit includes:
a DC power supply configured to generate a DC voltage;
an NFC interface configured to generate a control signal in response to an NFC signal; and
a voltage supply control circuit configured to supply the DC voltage to the electronic circuit in response to the control signal and maintain supply of the DC voltage to the electronic circuit in response to a voltage maintaining signal output from the electronic circuit powered on by the DC voltage.

7. The electronic device of claim 6, further comprising:
a biosensor configured to collect biometric information from a human body under control by the main controller unit; and
a Bluetooth signal processing circuit configured to process the biometric information of the biosensor in response to a Bluetooth signal transmitted from a Bluetooth device and transmit the processed biometric information to the Bluetooth device.

8. The electronic device of claim 7, wherein the biosensor includes a continuous invasive glucose sensor or a continuous non-invasive glucose sensor.

9. The electronic device of claim 6, wherein the voltage supply control circuit includes a switch circuit configured to be turned on in response to the control signal, supply the DC voltage to the electronic circuit, and remain turned on in response to the voltage maintaining signal.

10. The electronic device of claim 9, wherein the voltage supply control circuit further includes a switch control circuit control circuit configured to control the switch circuit to be turned on or off in response to the control signal and the voltage maintaining signal.

11. The electronic device of claim 6, further comprising a battery,
wherein the DC power supply is further configured to be enabled in response to the control signal, generate the DC voltage by using a battery voltage of the battery, and remain enabled in response to the voltage maintaining signal.

12. The electronic device of claim 11, wherein the voltage supply control circuit includes:
a first diode configured to receive the control signal; and
a second diode configured to receive the voltage maintaining signal,
wherein the DC power supply includes:
an input terminal configured to receive the battery voltage;
an output terminal configured to output the DC voltage; and
an enable terminal configured to receive an output signal of the first diode and an output signal of the second diode.

13. An operating method of an electronic device, the operating method comprising:
generating a control signal in response to a radio frequency signal;
supplying a DC voltage of a DC power supply to an electronic circuit in a power-off state in response to the control signal;
generating a voltage maintaining signal by using the electronic circuit that has been powered on by the DC voltage; and
maintaining the electronic circuit in a power-on state by continuously supplying the DC voltage to the electronic circuit according to the voltage maintaining signal.

14. The operating method of claim 13, further comprising:
collecting biometric information by using the electronic circuit that has been powered on by the DC voltage; and
controlling processing or communication of the biometric information.

\* \* \* \* \*